United States Patent [19]

Kanno et al.

[11] Patent Number: 4,908,905

[45] Date of Patent: Mar. 20, 1990

[54] ROTARY DAMPER

[75] Inventors: Tadayoshi Kanno, Yokohama; Masatoshi Oikawa, Tokyo, both of Japan

[73] Assignee: NIFCO, Inc., Yokohama, Japan

[21] Appl. No.: 283,773

[22] Filed: Dec. 13, 1988

[30] Foreign Application Priority Data

Jan. 12, 1988 [JP] Japan ................................. 63-3154

[51] Int. Cl.$^4$ ....................... E05F 5/02; F16D 57/00
[52] U.S. Cl. ..................................... 16/82; 188/290
[58] Field of Search ............ 16/82, DIG. 9, DIG. 21, 16/51; 188/290

[56] References Cited

U.S. PATENT DOCUMENTS

| 3,651,903 | 3/1972 | Butler et al. | 16/82 |
| 4,527,675 | 7/1985 | Omata et al. | 16/82; 188/290 |
| 4,614,004 | 9/1986 | Oshida | 16/82 |

FOREIGN PATENT DOCUMENTS 54-82614  12/1979  Japan.

Primary Examiner—Nicholas P. Godici
Assistant Examiner—Carmine Cuda
Attorney, Agent, or Firm—Schwartz & Weinrieb

[57] ABSTRACT

A rotary damper includes a sealed cylindrical housing containing viscous oil, a driven shaft rotatably supported within the housing, and a plurality of rotors and spacers arranged alternately and disposed upon a portion of the driven shaft extending in the axial direction of the housing. The rotors are held rotatably in unison with the driven shaft. The spacers are secured to the housing so as to permit the driven shaft to be rotated relative to the spacers. The rotors and spacers are formed with respective air-purging notches communicating with gaps defined between the rotors and the spacers whereby the air can be eliminated from such gaps and the viscous oil disposed within such gaps in order to provide the damper with the desired damping efficiency.

10 Claims, 1 Drawing Sheet

ROTARY DAMPER

FIELD OF THE INVENTION

This invention relates to a rotary damper for braking a door of a household electric appliance, a document file cabinet or the like.

DESCRIPTION OF THE PRIOR ART

Japanese Utility Model Disclosure No. 54-82614 discloses a rotary damper which comprises a sealed cylindrical housing containing a viscous oil, a driven shaft rotatably supported within the housing for receiving torque applied thereto, and a plurality of rotors and spacers alternately disposed upon a portion of the driven shaft extending within the housing, the rotors being held spaced apart in the axial direction and rotatable in unison with the driven shaft, the spacers being secured to the housing so as to permit rotation of the driven shaft relative to spacers.

This rotary damper is assembled by charging viscous oil such as silicone oil into the cylindrical housing with an open end thereof directed upward, then inserting the driven shaft with the rotors and spacers alternately disposed thereon into the housing and then closing the open end of the housing with a cap. However, the gaps defined between adjacent ones of the rotors and spacers disposed alternately upon the driven shaft are narrow, and air remaining in the form of bubbles within these gaps reduces the shearing resistance offered to the rotors rotating relative to the stationary spacers. For this reason, a desired braking effect cannot be obtained. Furthermore, fluctuations in the braking efficiency are liable to result when a plurality of rotary dampers having the same number of rotors and spacers of the same size are manufactured.

OBJECT OF THE INVENTION

An object of the invention is to provide a rotary damper which has a desired braking efficiency.

SUMMARY OF THE INVENTION

To attain the above object of the invention, there is provided a rotary damper, within which a plurality of rotors and spacers alternately accommodated within a cylindrical housing are disposed with respective air-purging notches communicating with the gaps defined between adjacent ones of the rotors and spacers.

In assembling the rotary damper, the rotors and spacers are alternately disposed upon the driven shaft, and the resultant assembly is inserted into the cylindrical housing filled with viscous oil. At this time, air disposed within the gaps defined between adjacent ones of the rotors and spacers is purged to the outside through means of the notches, and the gaps are entirely filled with the viscous oil. It is thus possible to obtain a rotary damper which is free from braking efficiency fluctuations and which has the desired braking efficiency.

BRIEF DESCRIPTION OF THE DRAWINGS

The above and other objects and features of the invention will become more apparent from the following detailed description with reference to the accompanying drawings, in which like reference characters designate like or corresponding parts throughout the several views, and wherein.

DETAILED DESCRIPTION OF THE PREFERRED EMBODIMENT

Figure 1:
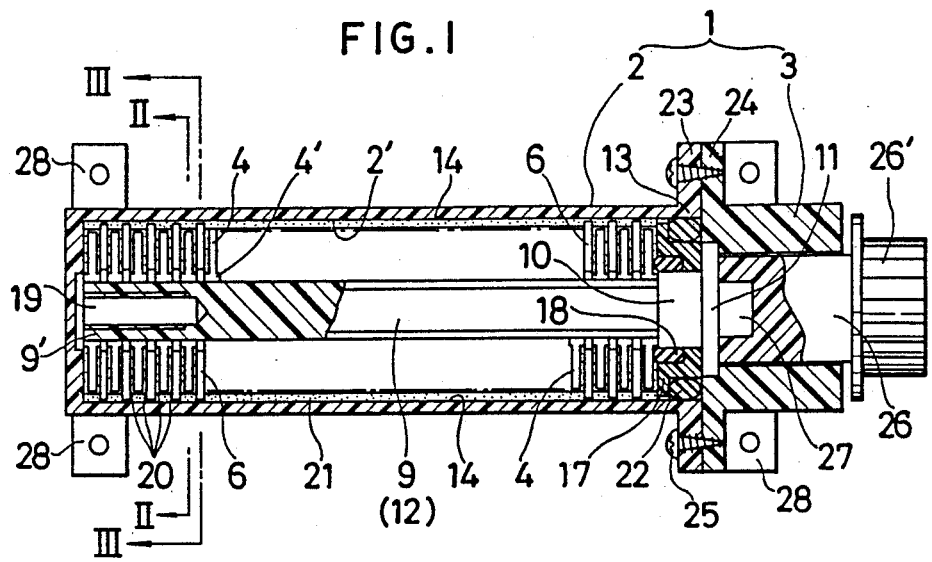
FIG. 1 is a sectional view showing an embodiment of the rotary damper according to the invention.
Figure 2:
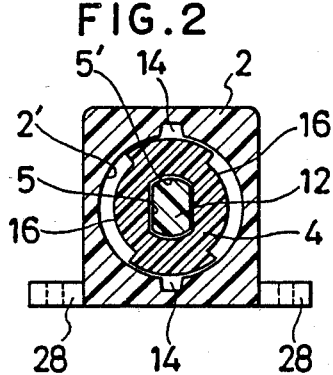
FIG. 2 is a sectional view taken along line II—II in FIG. 1.
Figure 3:
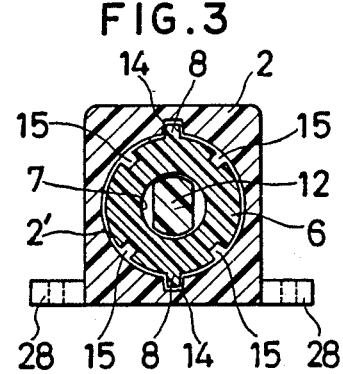
FIG. 3 is a sectional view taken along line III—III in FIG. 1.
Figure 4:
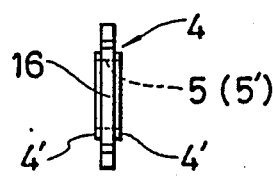
FIG. 4 is a side view showing a rotor of the rotary damper shown in FIG. 1.
Figure 5:
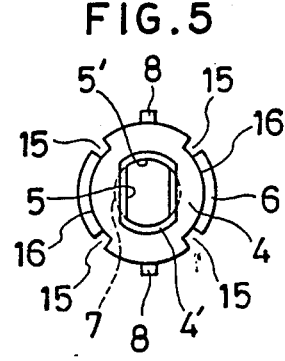
FIG. 5 is a front view showing the overlapped state of a spacer and a rotor in the rotary damper shown in FIG. 1.

The drawings illustrate one embodiment of the rotary damper according to the invention. Reference numeral 1 designates a cylindrical housing which comprises a cylindrical case 2 and a cap 3 closing one end of the case 2. The case 2 and cap 3 are plastic moldings. The case 2 has a square outer shape and has a cylindrical bore 2' open at one end.

Reference numeral 4 designates rotors, each having a central oval hole 5 and also having raised portions 4' formed upon opposite sides thereof along the edge of each hole 5. Reference numeral 6 designates spacers each having a central circular hole 7 having the same radius of curvature as each arcuate section 5' of the oval hole 5 of each rotor 4. Each spacer 6 has a pair of diametrically opposed small projections 8 projecting from the outer periphery thereof. Each rotor 4 and spacer 6 is a plastic molding.

Reference numeral 9 designates a driven shaft made from a suitable metal. In this embodiment, the shaft 9 is provided at one end with a cylindrical section 10 and a flange 11 slightly greater in diameter than the cylindrical section 10. The portion of the shaft 9 between the cylindrical section 10 and the other end 9' constitutes an oval shaft section 12 which can substantially snugly fit within the oval hole 5 of each rotor 4. The rotors 4 and spacers 6 are arranged alternately.

The axial depth of the cylindrical bore 2' of the cylindrical case 2 is set such that the flange 11 of the driven shaft 9 projects outwardly from case 2 when the other end 9' of the shaft 9 is in contact with the end wall of the case 2 within which bore 2' is defined. The bore 2' has an increased-diameter end portion 13 accommodating the cylindrical section 10 of the driven shaft 9 and has a diameter slightly greater than the outer diameters of each rotor 4 and spacer 6. The portion of the bore 2' internal with respect to the increased-diameter end portion 13 has an inner diameter substantially the same as the outer diameter of each rotor 4 and spacer 6 and is provided with a pair of diametrically opposed axial grooves 14 so as to accommodate the small projections 8 of the individual spacers 6. The grooves 14 are communication with the increased-diameter end portion 13.

The length of the oval shaft section 12 of the driven shaft 9 and the length of the portion of the bore 2' of the cylindrical case 2 other than the increased-diameter end portion 13 are equal and are determined by the number of the rotors 4 and spacers 6 which are alternately disposed upon the oval shaft section 12 of the driven shaft 9.

Each spacer 6 has four circumferentially arranged uniformly spaced-apart notches 15 formed in its outer periphery. Each rotor 4 has two diametrically opposed arcuate notches 16 formed in its outer periphery.

In assembling the rotary damper, an inner cap 17 having a hat-like sectional profile is mounted upon the driven shaft 9 at the end 9' thereof and is moved toward the opposite end thereof, and an O-ring 18 is fitted between the inner cap 17 and the cylindrical section 10 such that the inner cap 17 is disposed upon the cylindrical section 10 and in contact with the flange 11. Then, the rotors 4 and spacers 6 are alternately disposed of the oval shaft section 12, and the last rotor 4 that is mounted upon the shaft section 12 is secured with the head of a screw 19 threadedly engaged within the other end 9' of the shaft 9. As a result, the inner cap 17, rotors 4 and spacers 6 are fixedly secured with respect to each other with a narrow axial gap 20 being maintained between each adjacent pair of rotors 4 and spacers 6 by means of a raised portion 4' formed upon each side surface of each rotor. The rotors 4 are not rotatable with respect to the driven shaft 9 because their oval holes 5 are fitted upon the oval shaft section 12, whereas the spacers 6 are rotatable with respect to the shaft 9 because their circular holes 7, which have the same radius of curvature as the arc of the oval shaft section 12, are disposed about the shaft section 12. In addition, the small projections 8 projecting radially outwardly from the outer periphery of each spacer 6 can be aligned in the same direction.

Then, by holding the cylindrical case 2 containing viscous oil 21 with the open end up, the driven shaft 9, rotors 4, and spacers 6 fixedly secured with respect to one another are inserted downwardly into the case 2. At this time, the aligned small projections 8 of the spacers 6 are engaged within the grooves 14. Thus, air present within any one of the plurality of gaps 20 formed between adjacent rotors 4 and spacers 6 will escape upwardly toward to higher level gaps through the arcuate notches 16 defined within higher level rotors and notches 15 defined within higher level spacers and eventually pass to the outside through means of the gap defined between the outer periphery of the inner cap 17 and the increased-diameter end portion 13 of the cylindrical case. For this reason, the outer diameter of the inner cap 17 is set to be slightly smaller than the inner diameter of the increased-diameter end portion 13.

Thereafter, an O-ring 22 is disposed about cap 17 so as to seal the gap defined between the outer periphery of the inner cap 17 and the inner periphery of the increased-diameter end portion 13, and the flange 23 of the cylindrical case 2 at one end thereof and the flange 24 of the cap 3 are secured in butt contact with each other by means of screws 25.

The cap 3 has a central inner space which has a portion accommodating the flange 11 of the shaft 9 projecting outwardly from the open end of the cylindrical case 2 and a through-bore portion communicating with the aforementioned portion and accommodating a gear shaft 26. A projection 27 having an oval sectional profile projects axially outwardly from the flange 11. The projection 27 is accommodated within a recess formed within the inner end of the gear shaft and having a complementary shape so as to fix projection 27 within the recess and thereby to make the gear shaft 26 and driven shaft 9 integral with each other so that rotor torque is able to be transmitted to shaft 26 and shaft 9 from a gear 26' projecting outwardly from the cap 3. In order to secure the damper to a body, mounting brackets 28 are provided upon the cylindrical case 2 and/or cap 3.

By securing the cylindrical housing 1 assembled in the above way to a body and transmitting rotation to the gear 26', the shaft 9 and plurality of rotors 4 secured thereto are rotated by overcoming the viscous resistance offered by means of the viscous oil 21 filling the gaps 20 between the rotors 4 and the spacers 6, which are stationary and not rotatable with respect to the shaft 9. Thus, the effect of braking the output rotation, that is, a damper function, can be obtained. The degree of the braking effect depends upon the number of the rotors and spacers arranged alternately in the axial direction. In other words, the braking effect can be increased by using an increased number of rotors and spacers.

In this embodiment the hole 5 of the rotor has an oval shape complementary to the shape of the oval shaft section 12 of the driven shaft 9. However, the sectional profile of the shaft section need not be oval, but may have any suitable shape other than circular and, for instance, may have a D-shape or a polygonal shape. The shape of the hole of the rotor should, however, be complementary to the sectional profile of the shaft section.

The spacers and rotors are adapted such that their notches 15 and 16 are aligned in the axial direction irrespective of their orientation, so as to facilitate the escape of air from the gaps 20. However, the alignment of the notches in the axial direction is not an essential prerequisite because it is only necessary for the air in a given gap to enter a higher level gap 20 through means of notches of a lower level spacer (or rotor) and thence to enter a yet higher level gap through means of notches of the succeding rotor (or spacer) so has to eventually pass to the outside from the open end of the cylindrical case. Furthermore, while in the above embodiment the gear shaft 26 is coupled to the driven shaft 9, it is possible to use a one-piece shaft in place of these two shafts.

As has been described in the foregoing, according to the invention it is possible to purge air from the gaps defined between adjacent spacers and rotors and thus to fill the gaps with viscous oil, so that it is possible to provide a rotary damper which has a desired braking efficiency.

The degree of the braking effect can be controlled by increasing or decreasing the number of rotors and spacers used.

Obivously, many modifications and variations of the present invention are possible in light of the above teachings. It is therefore to be understood that within the scope of the appended claims, the present invention may be practiced otherwise than as specifically described herein.

What is claimed is:

1. A rotary damper, comprising:

a sealed housing having a viscous fluid disposed therein;

a shaft, having a non-circular configuration, rotatably supported within said housing and adapted to be rotatably driven by means of torque applied thereto;

a plurality of rotors, mounted upon said shaft, having a predetermined axial thickness as determined by means of forward and rearward radially extending surfaces, and hub portions extending axially beyond said forward and rearward surfaces so as to define hub regions of said rotors which have axial extents greater than said predetermined axial thickness of said rotors;

a plurality of spacers mounted upon said shaft in alternative positions with respect to said plurality of rotors mounted upon said shaft and engaged with said hub regions of said rotors so as to define gap spaces between said rotors and said spacers;

first air-purging hole means defined within each one of said plurality of rotors and fluidically communicating with said gap spaces;

axial bore means defined within each one of said rotors which has a configuration corresponding to said non-circular configuration of said shaft such that said rotors are rotated in unison along with said shaft under torque application conditions while said first air-purging hole means are axially aligned with respect to each other;

second air-purging hole means defined within each one of said plurality of spacers and fluidically communicating with said gap spaces;

axial bore means defined within each one of said spacers which is sufficiently large so as to permit said shaft to rotate with respect to said spacers;

projection means integrally defined upon said spacers; and groove means integrally defined within said housing for receiving said projection means of said spacers for preventing rotation of said spacers relative to said housing and for maintaining axial alignment of said second air-purging hole means of said spacers with respect to each other.

2. The rotary damper according to claim 1, wherein said first air-purging hole means notches of said rotor comprise a pair of diametrically opposed arcuate notches formed in the outer periphery of each rotor.

3. A rotary damper as set forth in claim 1, wherein: said housing has a substantially cylindrical configuration.

4. A rotary damper as set forth in claim 1, wherein: said non-circular configuration of said shaft comprises an oval; and said configuration of said axial bore means of said plurality of rotors comprises an oval.

5. A rotary damper as set forth in claim 1, wherein: said groove means of said housing comprises a pair of diametrically opposed, axially extending grooves; and said projection means of said spacers comprises a pair of diametrically opposed projections engaged within said diametrically opposed grooves of said housing.

6. A rotary damper as set fortn in claim 1, wherein: said viscous fluid comprises oil.

7. A rotary damper as set forth in claim 1, wherein: said second air-purging hole means of said spacers comprises four equidistantly spaced notches defined within the peripheral region of each one of said spacers.

8. A rotary damper as set forth in claim 1, wherein: said housing comprises a one-piece plastic molding open at one end; and a cap fixedly secured to said housing at said open end thereof for closing said open end thereof.

9. A rotary damper as set forth in claim 8, wherein: said cap has bore means defined therein for rotatably accommodating one end of said shaft within one end of said cap bore means and for rotatably accommodating gear drive means, operatively connected to said shaft, within an opposite end of said cap bore means.

10. A rotary damper as set forth in claim 1, wherein: said spacer axial bore means has the configuration of a circle, as seen in cross-section, which has an internal diameter which is greater than the largest diametrical portion of said shaft so as to permit said shaft to rotate within said circular axial bore means of said spacers.

* * * * *